Dec. 20, 1927.

M. R. PIERCE 1,653,585

CAMERA SEXTANT
Filed March 5, 1926

Inventor
Maurice R. Pierce
Attorney.

Inventor
Maurice R. Pierce
Attorney.

Dec. 20, 1927.

M. R. PIERCE 1,653,585

CAMERA SEXTANT

Filed March 5. 1926

Inventor
Maurice R. Pierce
Attorney.

Patented Dec. 20, 1927.

1,653,585

UNITED STATES PATENT OFFICE.

MAURICE R. PIERCE, OF LAKEHURST, NEW JERSEY.

CAMERA SEXTANT.

Application filed March 5, 1926. Serial No. 92,655. REISSUED

This invention relates to improvements in sextants, particularly adapted for use on aircraft where it becomes necessary to take readings from a celestial body and an artificial horizon at times when the natural horizon is not visible.

Before going into the details of the present invention it may be well to note that in taking altitude readings from aircraft with various types of sextants now in use, the great difficulty has been experienced in that when concentrating on centering the horizon level, the image of the celestial body usually disappears from the finder, and when concentrating on bringing the image back to its proper position on the finder, the level is displaced, making it extremely difficult to obtain an accurate reading without great range of error.

It is, therefore, one of the objects of the present invention to overcome this difficutly and to make a permanent record with both objects appearing thereon in order that proper corrections may be made and an accurate determination obtained.

A further object is to provide a sextant of the above character, of simple and practical construction whereby a photographic print or record may be easily and quickly procured.

A further object of the present invention is to provide an apparatus of the above character which may be conveniently operated, which will be of light and compact construction, and which may be inexpensively manufactured.

Other objects will be in part obvious and in part hereinafter pointed out in connection with the accompanying sheets of drawings illustrating two of various possible modifications and wherein similar reference characters denote corresponding parts. In these drawings, Figure 1 is a view of a camera sextant, parts being shown broken away, and parts shown conventionally for clearness of illustration.

Figure 2:
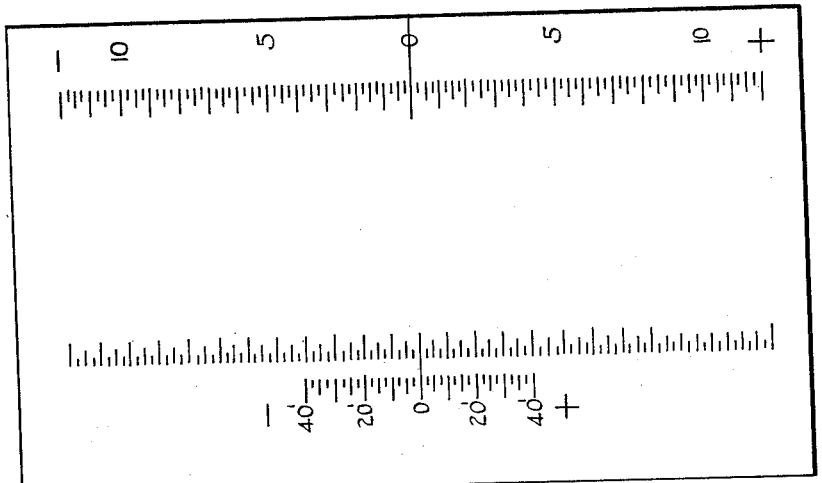
Figure 2 is an enlarged view of the grid used in the preferred form, showing combined grid and template, having the etched graduations and reference lines which are projected to the photographic print when the images are snapped.
Figure 1:
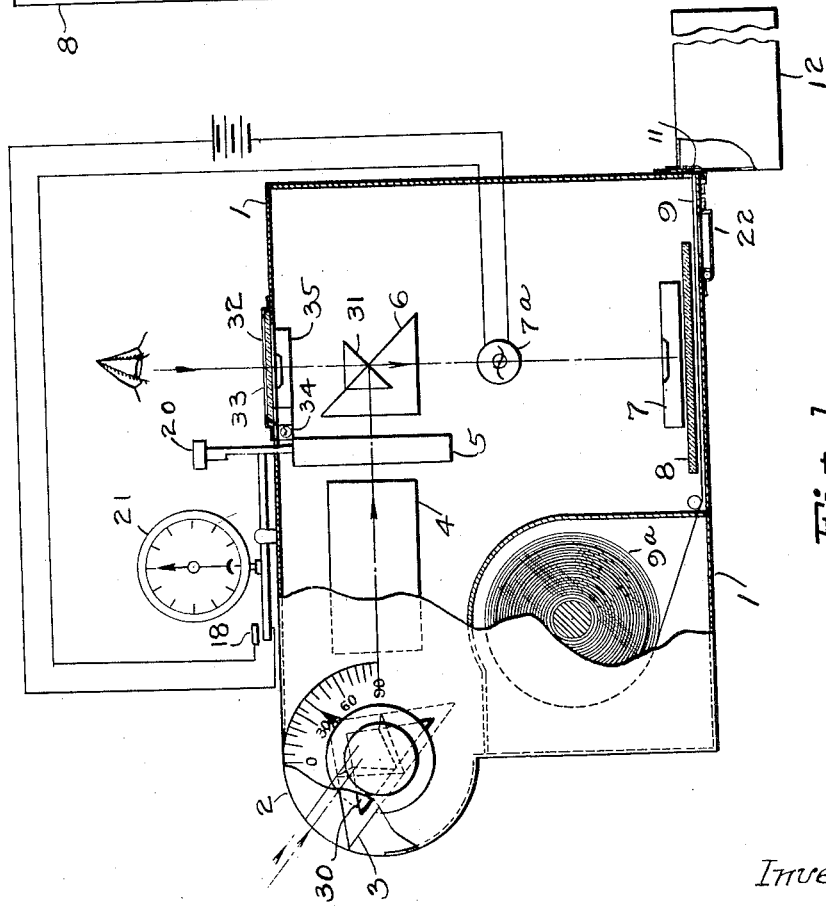

In the preferred form of this invention a true reading of altitude is obtained by roughly noting the angle of the setting of the prism lens, a positive correction reading from the horizontal image on the print and a positive correction reading from the celestial body image on the print. The horizon bubble image reading gives the true correction for not getting the sextant level, and the celestial body image reading gives the true correction for not centering in the finder sight.

The shadowgraph image, reference lines and graduations for reading the corrections are projected through the etched grid plate and the readings taken directly from the photographic print (direct in the preferred form).

In the modified form of this invention a true correction reading is obtained as before, by roughly noting the angle of the setting of the prism lens, by noting a positive correction reading from the horizon image, from the print, by placing an engraved transparent template over the print, and by reading the correction for true altitude from a celestial body.

The reason for having an alternative condition is due to the fact that where the image happens to be located directly under a reference line, a slight blur occurs. When the grid plate only contains the gauge lines a clear image is thus obtained on the photographic print, and the reading from the template graduations can be made more accurate.

With reference to the artificial horizon, it is to be understood that while the horizon bubble level has been shown as a means of illustration, it has been contemplated to use any other type of level gauge if preferred. A pendulum, gyro-compass or the like may be used without departing from the invention. By means of reflecting mirrors the images may be photographed in the same manner.

It is preferred, however, to use a liquid level to further reduce possible error and to save expense and weight in installation.

Referring to the drawing, the character 1 indicates a housing for inclosing the various parts having an opening 2 through which the image of the sun or other celestial body may pass. The image is reflected by a rotatably mounted prism 3 bearing a pointer that operates over graduations for indicating the angle of the setting of the prism, and then passes on through a lens 4. When the shutter 5 is operated, the rays pass on to a reflection prism 6 and are there reflected to a sensitized paper 9. The image of an artificial horizon indicator, or as illustrated, a bubble horizontal level 7, is also projected on the sensitized paper by the light rays reflected through the prism system. The intensity of the image of the artificial horizon indicator is increased by artificial illumination within the camera casing by any well known means such as an electric light 7ª, that is automatically switched on at the instant the shutter is operated. The current for the light may be supplied from batteries housed in the casing, or from any outside source if preferred. It will therefore be seen that as the rays are projected through the etched grid plate 8, a shadowgraph image of the celestial body, horizon level image, reference lines, and graduations are recorded on the sensitized paper strip. This strip is fed from the roll 9ª in any well known manner, severed by a cutter 11, and stored in a transfer-container 12. The exposed prints may be collected until the desired number of snap shots have been taken, and may then be developed in the usual manner.

A stop watch 21, and control switch 18 for the illuminating lamp are simultaneously controlled by the shutter operating button 20.

A window 22 is located at the bottom of the casing 1 for autographing the date, time, and angular setting of the prism lens on the back of the film for indentification after developing.

Figure 4:
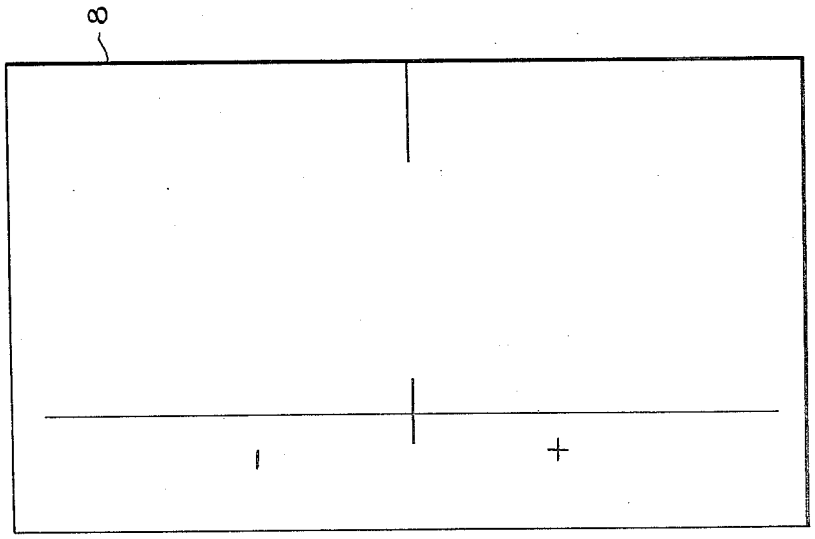
Figure 4 is an enlarged view of the grid used in the modified form, showing the reference lines which are projected to the photographic print when the images are snapped.
Figure 3:
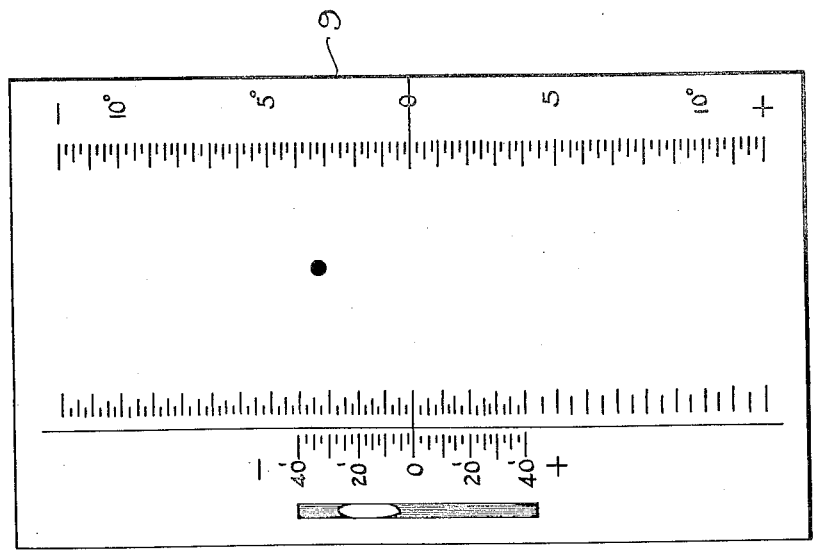
Figure 3 is a view of the exposed photographic print used in the preferred form, showing a position of the horizon bubble image, celestial body image, reference lines and graduations for a complete correction reading.
Figure 6:
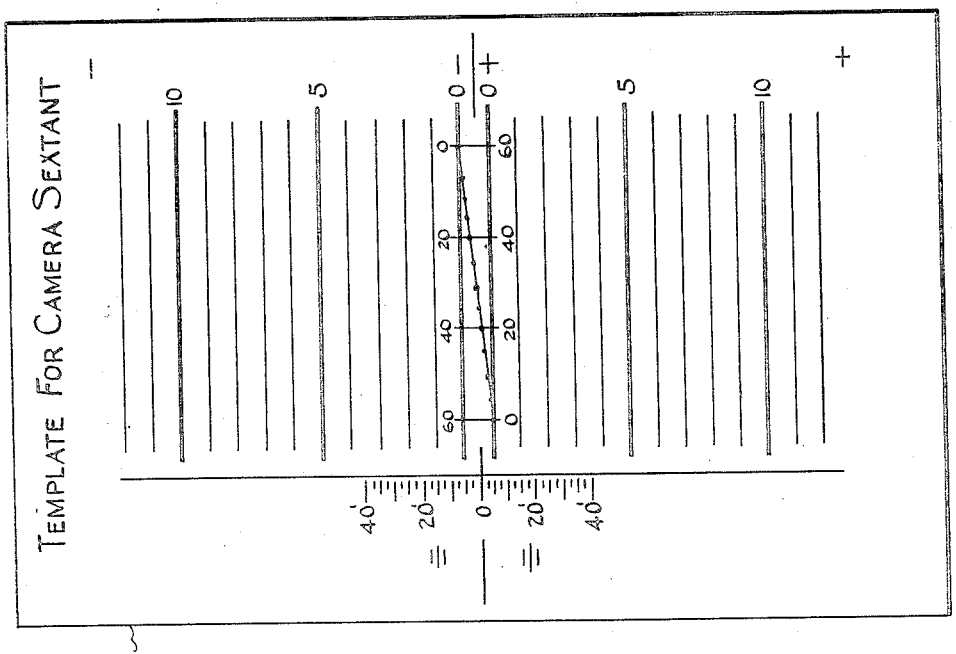
Figure 6 is a view of the template to be placed over the modified print shown in Figure 5, for taking readings for correction from the positions of the image.
Figure 5:
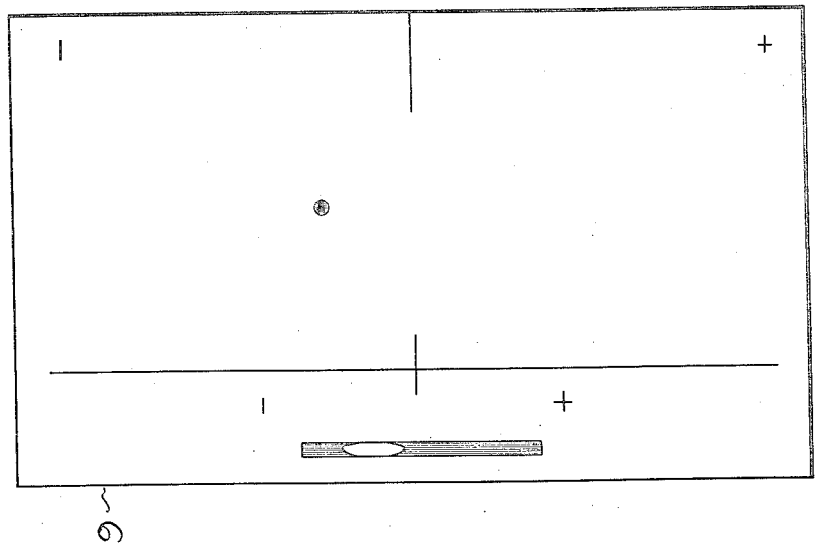
Figure 5 is a view of the exposed photographic print used in the modified form, showing a position of the horizon bubble image, celestial body image, and reference lines projected through the grid.

The grid plate 8 may contain all the graduations for determining the correction readings by projecting the same to the print, see Fig. 2, or may bear certain reference or base lines as indicated in Fig. 4. The scale etched to the left is for reading the bubble horizon correction, and represents a horizontal base line and the graduations of the scale indicate two and one-half minute intervals. The graduations to the right of the vertical reference line are used to determine the correction for the celestial image, and represent intervals of fifteen seconds.

When the grid and template are combined as in the preferred form, all graduations will appear on the print, and the readings are taken directly from the print, but when the grid plate only bears certain reference lines and the template bears the graduations, the print after being developed is placed on a flat surface, with the horizon image to the left, and the template moved about until one of the vertical lines on the print which was projected from the reference line on the grid, registers with the lines on the template and the horizon level image is centered under either of the two groups of three short parallel lines indicating + or −. The horizontal reference line on the print is used to read the true correction for not holding the sextant level. The template is then shifted to register the image of the celestial body on the print, under the diagonal line on the template, and the correction for not getting the celestial body centered in the finder is read from the reference line on the print either + or −.

The combined readings will then ascertain the true altitude reading from a celestial body.

It may be useful to remember that when the horizontal level image, and the image of a celestial body are above the reference or base line on print, that the plate intervals are +.

In order to sight the instrument, two focal systems are necessary, one as previously described for recording the celestial image, and the other to center the reflection of the celestial body in a finder.

Located at the opening 2 is a smaller prism lens 30 operated simultaneously by the same rotating and angle reading graduations as the prism 3. The prism 30 is located to one side of the path of the main lens focal system, so that the reflection of the celestial image is deflected by the prism 30 to a fixed prism 31 which directs the image to a finder 32 located on top of the sextant, in a convenient position to be sighted by the eye.

The finder 32 is shaded by a frosted glass 33 to soften the brightest reflections from the observer's eyes. The finder is also provided with bubble levels 34 and 35 for further aid in bringing the error of correction to a minimum by bringing the instrument to an approximately level position while making an exposure.

It is believed that the operation of the present device will be clear to those skilled in the art and after obtaining the desired print showing the relative location of the bubble image and the image of the celestial body with reference to certain guide markings, the true corrections may be made and the problem easily and quickly solved.

The invention is, therefore, believed to accomplish, among others, all of the objects and advantages herein set forth.

What I claim is:—

1. A sextant camera including a casing provided with an opening for the admission of light to the interior of the casing, means normally excluding the light, prisms within the opening, other prisms within the casing on the opposite side of the shutter, a horizontal level, a grid, and means for supporting a sensitized paper for the reception of an image of a celestial body, an image of the horizon and an image of the grid when the shutter is opened.

2. A sextant camera including a casing, a finder, means for supporting a sensitized paper in the casing, a focal system for projecting the image of a body to the finder, a focal system for simultaneously projecting the said image to the sensitized paper, and a single means for excluding the image from both the finder and the paper.

3. A sextant camera including a casing, a finder, means for supporting a sensitized paper in the casing, adjustable prisms mounted in the wall of the casing, means for determining the angle of adjustment of the prisms, a plurality of fixed prisms within the casing for simultaneously deflecting the image projected by the adjustable prisms to the finder and sensitized paper, and means for normally excluding light from the casing interior.

4. In a sextant camera the combination of a casing, having an opening therein, a plurality of rotatable prisms within the opening, a lens, a shutter, a plurality of fixed prisms within the casing and in alignment with the rotatable prisms and lens, a finder disposed at a point optically opposite one of the fixed prisms, and means disposed optically opposite the other of the fixed prisms for recording an image focused thereupon by the lens.

5. A sextant camera including a casing, a plurality of movable prisms, a lens, a shutter, a finder, a plurality of fixed prisms, an artificial horizon, a template, and means for simultaneous recording of an image of a body, the artificial horizon and the template.

Signed at Lakehurst, New Jersey, this 30th day of December, 1925.

MAURICE R. PIERCE.